(12) United States Patent
Schepers

(10) Patent No.: US 7,025,278 B2
(45) Date of Patent: Apr. 11, 2006

(54) METHOD FOR PREVENTING ILLEGITIMATE USE OF CHIP CARDS

(75) Inventor: Jörg Schepers, Rottach-Egern (DE)

(73) Assignee: Infineon Technologies AG, Munich (DE)

( * ) Notice: Subject to any disclaimer, the term of this patent is extended or adjusted under 35 U.S.C. 154(b) by 635 days.

(21) Appl. No.: 10/017,639

(22) Filed: Nov. 21, 2001

(65) Prior Publication Data

US 2004/0112965 A1 Jun. 17, 2004

Related U.S. Application Data

(63) Continuation of application No. PCT/DE00/01544, filed on May 16, 2000.

(30) Foreign Application Priority Data

May 21, 1999 (DE) ............................... 199 23 472

(51) Int. Cl.
*G06K 19/06* (2006.01)

(52) U.S. Cl. ...................... 235/492; 235/451; 235/487; 235/494; 340/870; 340/16; 340/561; 340/571; 340/540; 340/562

(58) Field of Classification Search ................ 235/451, 235/487, 492, 494; 713/189, 164; 380/2, 380/52; 340/870.16, 561, 540, 562, 571, 340/870, 16; 174/52.2; 700/233
See application file for complete search history.

(56) References Cited

U.S. PATENT DOCUMENTS

| 4,575,621 | A | * | 3/1986 | Dreifus ........................ 235/380 |
| 4,661,797 | A | * | 4/1987 | Schmall ....................... 340/561 |
| 5,245,314 | A | * | 9/1993 | Kah, Jr. ................... 340/539.13 |
| 5,412,318 | A | | 5/1995 | Vauclin |
| 5,461,372 | A | | 10/1995 | Busak et al. |
| 5,533,123 | A | * | 7/1996 | Force et al. ................. 713/189 |
| 6,068,192 | A | * | 5/2000 | McCabe et al. ............. 235/487 |
| 6,259,022 | B1 | * | 7/2001 | Steffen ....................... 174/52.2 |
| 6,295,482 | B1 | * | 9/2001 | Tognazzini .................. 700/233 |
| 6,724,169 | B1 | * | 4/2004 | Majumdar et al. ........... 318/811 |
| 2002/0186145 | A1 | * | 12/2002 | Chainer et al. ........ 340/870.16 |

FOREIGN PATENT DOCUMENTS

| DE | 4205827 A1 | 9/1993 |
| DE | 19543909 A1 | 5/1997 |
| DE | 19610070 A1 | 9/1997 |
| EP | 0481881 A1 | 4/1992 |
| EP | 0718794 A1 | 6/1996 |
| FR | 2693014 | 12/1993 |
| GB | 2098766 A | 11/1982 |

* cited by examiner

*Primary Examiner*—Jared J. Fureman
*Assistant Examiner*—Allyson N Trail
(74) *Attorney, Agent, or Firm*—Laurence A. Greenberg; Werner H. Stemer; Ralph E. Locher

(57) ABSTRACT

In order to detect attempted interventions in the vicinity of a smart card, a sensor hierarchy is used. Abnormal operating states are first detected by less sensitive sensors that are connected upstream and which then activate sensors which are connected downstream and have a relatively high degree of sensitivity, or increase the sensitivity of sensors connected downstream.

3 Claims, No Drawings

METHOD FOR PREVENTING ILLEGITIMATE USE OF CHIP CARDS

CROSS-REFERENCE TO RELATED APPLICATION

This application is a continuation of copending International Application No. PCT/DE00/01544, filed May 16, 2000, which designated the United States.

BACKGROUND OF THE INVENTION

Field of the Invention

The present invention relates to a method with which it is possible to detect whether an attempt is made at manipulatory intervention in a chip card or smart card.

Because chip cards should be reliable during regular use and, unauthorized use of the card must be detected, there is the problem that it is difficult to set a practical level of sensitivity for a system for protecting against attempts at intervention. A sensory protection system is intended to ensure that abnormal operating states that can be exploited during an attempt at intervention are sensed and attempts at manipulatory interventions are themselves detected. If the sensors are set at too sensitive a level so that they respond even when there are small deviations from the normal state, they also react to unavoidable small fluctuations in the operating conditions. As a result, the reliability of the respective product is, under certain circumstances, greatly restricted, for example even slight short-term current fluctuations in a card reader lead to a reset of the controller. For this reason it is necessary to make compromises in the setting of the sensitivity of such protection sensors.

SUMMARY OF THE INVENTION

It is accordingly an object of the invention to provide a method for preventing illegitimate use of chip cards which overcomes the above-mentioned disadvantages of the prior art methods of this general type, in which an unauthorized attempt at intervention in a chip card can be reliably detected and prevented without the normal appropriate use of the card being adversely affected.

With the foregoing and other objects in view there is provided, in accordance with the invention, a method for detecting an attempt at manipulatory intervention in a smart card. The method includes the steps of using various sensors for detecting abnormal operating states; sensing an occurrence of an abnormal operating state by some of the sensors; and activating the sensors with a relatively high degree of sensitivity relative to an overall sensitivity of the sensors as a group after the abnormal operating state has been sensed.

In accordance with an added mode of the invention, there is the step of providing the sensors with different degrees of sensitivity and successively more sensitive sensors are activated after the abnormal operating state has been sensed.

In accordance with a further mode of the invention, there is the step of providing the sensors with sensitivities that can be set at different degrees, and the sensors that are used are successively switched to a higher sensitization state after the abnormal operating state has been sensed.

Other features which are considered as characteristic for the invention are set forth in the appended claims.

Although the invention is described herein as embodied in a method for preventing illegitimate use of chip cards, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DESCRIPTION OF THE PREFERRED EMBODIMENT

The method according to the invention provides for a stepped system for sensing an attempt at intervention in which sensors which are connected upstream do not immediately trigger a reset or a similar targeted countermeasure in every case, but rather only activate sensors which are connected downstream and which have a relatively high level of sensitivity. The problem of the restricted reliability is thus overcome because it is possible to react adequately even to small signals indicating an attempt at intervention. Such a multi-step sensor hierarchy can in particular also react in a targeted fashion to different signal combinations. It is possible, for example, for an optical sensor with a high level of sensitivity to activate electrical sensors which are connected downstream and have a relatively high level of sensitivity or to increase the sensitivity of such sensors.

The method according to the invention uses a sensor hierarchy with which it is possible to react indirectly to abnormal operating states. The sensors used are successively switched into a higher sensitization state and/or successively more sensitive sensors are activated. In this way, it is possible, in particular, also to bring about a situation in which combinations of different signals indicating an attempt at intervention can be evaluated, for example optically and electrically or thermally. The method therefore permits a stepped reaction to scenarios in which intervention is attempted.

In principle, any desired combination of different sensors with different sensitivities can be used in the method according to the invention. For example, the accumulated occurrence of small spikes in the operating signals can be used to increase the sensitivity of the spike sensors, or it is possible to trigger an alarm indicating an attempt at intervention, and thus for example to trigger a reset, when there is a simultaneous occurrence of relatively small spikes in combination with an operating voltage which lies at the limit of the voltage sensors.

I claim:

1. A method for detecting an attempt at manipulatory intervention in a smart card, which comprises the steps of:
   using various sensors for detecting abnormal operating states;
   sensing an occurrence of an abnormal operating state by some of the sensors; and
   after the abnormal operating state has been sensed but before triggering a countermeasure, at least one of:
   successively switching the sensors into a higher sensitization state, or
   successively activating more sensitive sensors.

2. The method according to claim 1, which comprises providing the sensors with different degrees of sensitivity.

3. The method according to claim 1, which comprises providing the sensors with sensitivities which can be set at different degrees.

\* \* \* \* \*